US012677229B2

(12) United States Patent
Manolakis et al.

(10) Patent No.: US 12,677,229 B2
(45) Date of Patent: Jul. 7, 2026

(54) ADJUSTING UPLINK SYNCHRONIZATION TIMER

(71) Applicant: Nokia Technologies Oy, Espoo (FI)

(72) Inventors: Konstantinos Manolakis, Munich (DE); Frank Frederiksen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 294 days.

(21) Appl. No.: 18/574,617

(22) PCT Filed: Jun. 28, 2022

(86) PCT No.: PCT/FI2022/050475
§ 371 (c)(1),
(2) Date: Dec. 27, 2023

(87) PCT Pub. No.: WO2023/012403
PCT Pub. Date: Feb. 9, 2023

(65) Prior Publication Data
US 2024/0292347 A1     Aug. 29, 2024

(30) Foreign Application Priority Data

Aug. 6, 2021    (FI) ..................................... 20215842

(51) Int. Cl.
*H04W 56/00*         (2009.01)
*H04B 7/185*         (2006.01)
(52) U.S. Cl.
CPC .... *H04W 56/0005* (2013.01); *H04B 7/18513* (2013.01); *H04W 56/0045* (2013.01)

(58) Field of Classification Search
CPC ......... H04W 56/0005; H04W 56/0045; H04W 64/006; H04W 84/06; H04B 7/18513; H04B 7/18519; G01S 19/00; G01S 19/396
(Continued)

(56) References Cited

U.S. PATENT DOCUMENTS 8,125,382 B2    2/2012  Derbez et al.
8,207,890 B2    6/2012  Venkatraman et al.
(Continued)

FOREIGN PATENT DOCUMENTS

CN         112702106 A      4/2021
EP         3826380 A1       5/2021
(Continued)

OTHER PUBLICATIONS

"3rd Generation Partnership Project; Technical Specification Group Radio Access Network; NR; Physical layer procedures for control (Release 16)", 3GPP TS 38.213, V16.6.0, Jun. 2021, pp. 1-187.
(Continued)

*Primary Examiner* — Michael Y Mapa
(74) *Attorney, Agent, or Firm* — Carter, DeLuca & Farrell LLP

(57)            ABSTRACT

Disclosed is a method comprising adjusting one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global
(Continued)

navigation satellite system, an accuracy requirement for timing advance estimation performed by the apparatus, and/or a common timing advance broadcast rate.

1 Claim, 9 Drawing Sheets

(58) Field of Classification Search
USPC ......................... 370/316; 455/12.1–13.2, 502
See application file for complete search history.

(56) References Cited

U.S. PATENT DOCUMENTS

| | | | |
|---|---|---|---|
| 10,795,028 B2 | 10/2020 | Niemenlehto | |
| 2009/0278741 A1 | 11/2009 | Miyata | |
| 2010/0020786 A1* | 1/2010 | Futaki ................. | H04W 56/004 |
| | | | 370/350 |
| 2021/0168746 A1* | 6/2021 | Mi .................... | H04W 56/0045 |
| 2022/0124645 A1* | 4/2022 | Yang ................. | H04W 56/0045 |

FOREIGN PATENT DOCUMENTS

| | | |
|---|---|---|
| WO | 2019/096698 A1 | 5/2019 |
| WO | 2021/066696 A1 | 4/2021 |
| WO | 2021/066734 A1 | 4/2021 |
| WO | 2021/139665 A1 | 7/2021 |

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304, V16.5.0, Jun. 2021, pp. 1-39.

"3rd Generation Partnership Project; Technical Specification Group Radio Access Network; NR; Medium Access Control (MAC) pro-tocol specification (Release 16)", 3GPP TS 38.321, V16.5.0, Jun. 2021, pp. 1-157.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

"Solutions for NR to support non-terrestrial networks (NTN)", 3GPP TSG RAN meeting #90-e, RP-202908, Agenda: 9.8.6, Thales, Dec. 7-11, 2020, 10 pages.

"New Study WID on NB-IoT/eTMC support for NTN", 3GPP TSG RAN Meeting #86, RP-193235, Agenda: xxx, MediaTek Inc., Dec. 9-31, 2019 , 4 pages.

Robustelli et al., "Signal in Space Error and Ephemeris Validity Time Evaluation of Milena and Doresa Galileo Satellites", Sensors, vol. 19, No. 8, Apr. 14, 2019, pp. 1-16.

Office action received for corresponding Finnish Patent Application No. 20215842, dated Mar. 9, 2022, 10 pages.

International Search Report and Written Opinion received for corresponding Patent Cooperation Treaty Application No. PCT/FI2022/050475, dated Oct. 7, 2022, 16 pages.

"Discussion on time and frequency synchronization for NR over NTN", 3GPP TSG RAN WG1 #105, R1-2104828, Agenda: 8.4.2, Nokia, May 19-27, 2021, 13 pages.

"Time and frequency synchronization for NR over NTN", 3GPP TSG RAN WG1 #106-e, R1-2108091, Agenda: 8.4.2, Nokia, Aug. 16-27, 2021, 17 pages.

"3rd Generation Partnership Project; Technical Specification Group Radio Access Network; NR; Radio Resource Control (RRC) pro-tocol specification (Release 17)", 3GPP TS 38.331, V17.6.0, Sep. 2023, pp. 1-1337.

Partial European Search Report received for corresponding European Patent Application No. 22852395.7, dated May 8, 2025, 11 pages.

Extended European Search Report received for corresponding European Patent Application No. 22852395.7, dated Jul. 31, 2025, 11 pages.

\* cited by examiner

301 | Adjust one or more timers associated with uplink synchronization

401 | Adjust ephemeris validity timer

402 | (Re)start adjusted ephemeris validity timer

403 | Update received before timer expires?          Yes

No

404 | Resynchronize or wait for update

1100

1200

1

ADJUSTING UPLINK SYNCHRONIZATION TIMER

RELATED APPLICATION

This application was originally filed as PCT Application No. PCT/FI2022/050475, filed on Jun. 28, 2022, which claims priority from FI application No. 20215842, filed on Aug. 6, 2021, each of which is incorporated herein by reference in its entirety.

FIELD

The following exemplary embodiments relate to wireless communication and to non-terrestrial networks.

BACKGROUND

In a non-terrestrial network, a satellite may be used to provide a communication service to a terminal device on Earth. There is a challenge in how to maintain uplink synchronization, while the terminal device and the satellite are moving.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: adjust one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global navigation satellite system, an accuracy requirement for timing advance estimation performed by the apparatus, and/or a common timing advance broadcast rate.

According to another aspect, there is provided an apparatus comprising means for: adjusting one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global navigation satellite system, an accuracy requirement for timing advance estimation performed by the apparatus, and/or a common timing advance broadcast rate.

According to another aspect, there is provided a method comprising: adjusting one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global navigation satellite system, an accuracy requirement for timing advance estimation performed by the apparatus, and/or a common timing advance broadcast rate.

According to another aspect, there is provided a computer program comprising instructions for causing an apparatus to perform at least the following: adjusting one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global navigation satellite system, an accuracy requirement for timing advance estimation performed by the apparatus, and/or a common timing advance broadcast rate.

According to another aspect, there is provided a computer program product comprising program instructions which, when run on a computing apparatus, cause the computing apparatus to perform at least the following: adjusting one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global navigation satellite system, an accuracy requirement for timing advance estimation performed by the apparatus, and/or a common timing advance broadcast rate.

According to another aspect, there is provided a computer readable medium comprising program instructions for causing an apparatus to perform at least the following: adjusting one or more timers associated with uplink synchronization based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a global navigation satellite system, an accuracy requirement for timing advance estimation performed by the apparatus, and/or a common timing advance broadcast rate.

According to another aspect, there is provided a non-transitory computer readable medium comprising program instructions for causing an apparatus to perform at least the following: adjusting one or more timers associated with uplink synchronization based at least partly on at least one of: a velocity of the apparatus, a velocity of a satellite, a
movement direction of the apparatus, a movement direction
of the satellite, a relative speed between the apparatus and
the satellite, an accuracy of ephemeris information associ-
ated with the satellite, an orbit propagator model associated
with the satellite, a first elevation angle between the appa-
ratus and the satellite, a second elevation angle between a
base station and the satellite, an accuracy of location infor-
mation provided by a global navigation satellite system, an
accuracy requirement for timing advance estimation per-
formed by the apparatus, and/or a common timing advance
broadcast rate.

According to another aspect, there is provided an appa-
ratus comprising at least one processor, and at least one
memory including computer program code, wherein the at
least one memory and the computer program code are
configured, with the at least one processor, to cause the
apparatus to: transmit, to a terminal device, an initial value
for at least one timer associated with uplink synchronization;
transmit, to the terminal device, one or more threshold
values for adjusting the initial value of the at least one timer,
wherein the one or more threshold values are associated with
at least one of: a velocity of the terminal device, a velocity
of a satellite, a movement direction of the terminal device,
a movement direction of the satellite, a relative speed
between the terminal device and the satellite, an accuracy of
ephemeris information associated with the satellite, a first
elevation angle between the terminal device and the satellite,
a second elevation angle between the apparatus and the
satellite, an accuracy of location information provided by a
global navigation satellite system, an accuracy requirement
for timing advance estimation performed by the terminal
device, and/or a common timing advance broadcast rate of
the apparatus; and receive, from the terminal device, an
indication indicating an adjustment of the initial value of the
at least one timer.

According to another aspect, there is provided an appa-
ratus comprising means for: transmitting, to a terminal
device, an initial value for at least one timer associated with
uplink synchronization; transmitting, to the terminal device,
one or more threshold values for adjusting the initial value
of the at least one timer, wherein the one or more threshold
values are associated with at least one of: a velocity of the
terminal device, a velocity of a satellite, a movement direc-
tion of the terminal device, a movement direction of the
satellite, a relative speed between the terminal device and
the satellite, an accuracy of ephemeris information associ-
ated with the satellite, a first elevation angle between the
terminal device and the satellite, a second elevation angle
between the apparatus and the satellite, an accuracy of
location information provided by a global navigation satel-
lite system, an accuracy requirement for timing advance
estimation performed by the terminal device, and/or a com-
mon timing advance broadcast rate of the apparatus; and
receiving, from the terminal device, an indication indicating
an adjustment of the initial value of the at least one timer.

According to another aspect, there is provided a method
comprising: transmitting, to a terminal device, an initial
value for at least one timer associated with uplink synchro-
nization; transmitting, to the terminal device, one or more
threshold values for adjusting the initial value of the at least
one timer, wherein the one or more threshold values are
associated with at least one of: a velocity of the terminal
device, a velocity of a satellite, a movement direction of the
terminal device, a movement direction of the satellite, a
relative speed between the terminal device and the satellite,
an accuracy of ephemeris information associated with the satellite, a first elevation angle between the terminal device
and the satellite, a second elevation angle between the
apparatus and the satellite, an accuracy of location informa-
tion provided by a global navigation satellite system, an
accuracy requirement for timing advance estimation per-
formed by the terminal device, and/or a common timing
advance broadcast rate of the apparatus; and receiving, from
the terminal device, an indication indicating an adjustment
of the initial value of the at least one timer.

According to another aspect, there is provided a computer
program comprising instructions for causing an apparatus to
perform at least the following: transmitting, to a terminal
device, an initial value for at least one timer associated with
uplink synchronization; transmitting, to the terminal device,
one or more threshold values for adjusting the initial value
of the at least one timer, wherein the one or more threshold
values are associated with at least one of: a velocity of the
terminal device, a velocity of a satellite, a movement direc-
tion of the terminal device, a movement direction of the
satellite, a relative speed between the terminal device and
the satellite, an accuracy of ephemeris information associ-
ated with the satellite, a first elevation angle between the
terminal device and the satellite, a second elevation angle
between the apparatus and the satellite, an accuracy of
location information provided by a global navigation satel-
lite system, an accuracy requirement for timing advance
estimation performed by the terminal device, and/or a com-
mon timing advance broadcast rate of the apparatus; and
receiving, from the terminal device, an indication indicating
an adjustment of the initial value of the at least one timer.

According to another aspect, there is provided a computer
program product comprising program instructions which,
when run on a computing apparatus, cause the computing
apparatus to perform at least the following: transmitting, to
a terminal device, an initial value for at least one timer
associated with uplink synchronization; transmitting, to the
terminal device, one or more threshold values for adjusting
the initial value of the at least one timer, wherein the one or
more threshold values are associated with at least one of: a
velocity of the terminal device, a velocity of a satellite, a
movement direction of the terminal device, a movement
direction of the satellite, a relative speed between the
terminal device and the satellite, an accuracy of ephemeris
information associated with the satellite, a first elevation
angle between the terminal device and the satellite, a second
elevation angle between the apparatus and the satellite, an
accuracy of location information provided by a global
navigation satellite system, an accuracy requirement for
timing advance estimation performed by the terminal
device, and/or a common timing advance broadcast rate of
the apparatus; and receiving, from the terminal device, an
indication indicating an adjustment of the initial value of the
at least one timer.

According to another aspect, there is provided a computer
readable medium comprising program instructions for caus-
ing an apparatus to perform at least the following: transmit-
ting, to a terminal device, an initial value for at least one
timer associated with uplink synchronization; transmitting,
to the terminal device, one or more threshold values for
adjusting the initial value of the at least one timer, wherein
the one or more threshold values are associated with at least
one of: a velocity of the terminal device, a velocity of a
satellite, a movement direction of the terminal device, a
movement direction of the satellite, a relative speed between
the terminal device and the satellite, an accuracy of ephem-
eris information associated with the satellite, a first elevation
angle between the terminal device and the satellite, a second elevation angle between the apparatus and the satellite, an accuracy of location information provided by a global navigation satellite system, an accuracy requirement for timing advance estimation performed by the terminal device, and/or a common timing advance broadcast rate of the apparatus; and receiving, from the terminal device, an indication indicating an adjustment of the initial value of the at least one timer.

According to another aspect, there is provided a non-transitory computer readable medium comprising program instructions for causing an apparatus to perform at least the following: transmitting, to a terminal device, an initial value for at least one timer associated with uplink synchronization; transmitting, to the terminal device, one or more threshold values for adjusting the initial value of the at least one timer, wherein the one or more threshold values are associated with at least one of: a velocity of the terminal device, a velocity of a satellite, a movement direction of the terminal device, a movement direction of the satellite, a relative speed between the terminal device and the satellite, an accuracy of ephemeris information associated with the satellite, a first elevation angle between the terminal device and the satellite, a second elevation angle between the apparatus and the satellite, an accuracy of location information provided by a global navigation satellite system, an accuracy requirement for timing advance estimation performed by the terminal device, and/or a common timing advance broadcast rate of the apparatus; and receiving, from the terminal device, an indication indicating an adjustment of the initial value of the at least one timer.

According to another aspect, there is provided a system comprising at least a terminal device and a base station. The base station is configured to: transmit, to a terminal device, an initial value for at least one timer associated with uplink synchronization; transmit, to the terminal device, one or more threshold values for adjusting the initial value of the at least one timer, wherein the one or more threshold values are associated with at least one of: a velocity of the terminal device, a velocity of a satellite, a movement direction of the terminal device, a movement direction of the satellite, a relative speed between the terminal device and the satellite, an accuracy of ephemeris information associated with the satellite, a first elevation angle between the terminal device and the satellite, a second elevation angle between the apparatus and the satellite, an accuracy of location information provided by a global navigation satellite system, an accuracy requirement for timing advance estimation performed by the terminal device, and/or a common timing advance broadcast rate of the apparatus; and receive, from the terminal device, an indication indicating an adjustment of the initial value of the at least one timer. The terminal device is configured to: adjust the initial value of the at least one timer based at least partly on the one or more threshold values; and transmit, to the base station, the indication indicating the adjustment of the initial value of the at least one timer.

According to another aspect, there is provided a system comprising at least a terminal device and a base station. The base station comprises means for: transmitting, to a terminal device, an initial value for at least one timer associated with uplink synchronization; transmitting, to the terminal device, one or more threshold values for adjusting the initial value of the at least one timer, wherein the one or more threshold values are associated with at least one of: a velocity of the terminal device, a velocity of a satellite, a movement direction of the terminal device, a movement direction of the satellite, a relative speed between the terminal device and the satellite, an accuracy of ephemeris information associated with the satellite, a first elevation angle between the terminal device and the satellite, a second elevation angle between the apparatus and the satellite, an accuracy of location information provided by a global navigation satellite system, an accuracy requirement for timing advance estimation performed by the terminal device, and/or a common timing advance broadcast rate of the apparatus; and receiving, from the terminal device, an indication indicating an adjustment of the initial value of the at least one timer. The terminal device comprises means for: adjusting the initial value of the at least one timer based at least partly on the one or more threshold values; and transmitting, to the base station, the indication indicating the adjustment of the initial value of the at least one timer.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
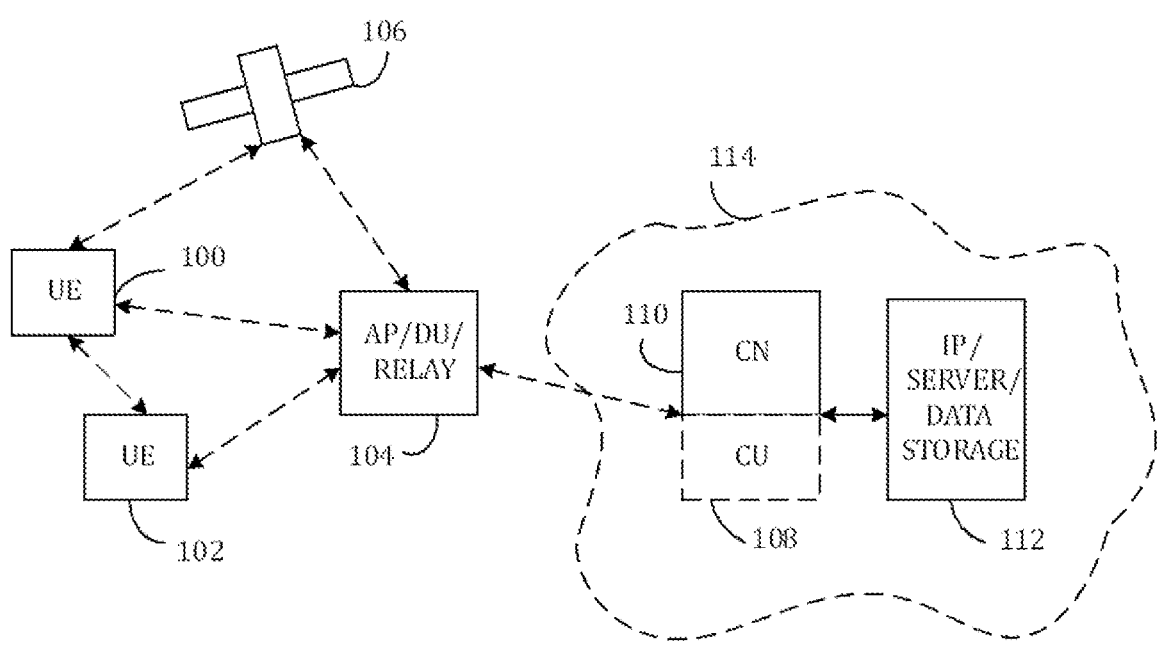
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Non-terrestrial networks (NTN) may be used to provide 5G NR services to UEs on Earth via, for example, low-Earth orbit (LEO) satellites, geostationary satellites or geosynchronous equatorial orbit (GEO) satellites, high-altitude platform systems (HAPS), and/or unmanned aerial vehicles (UAV).

Figure 2:
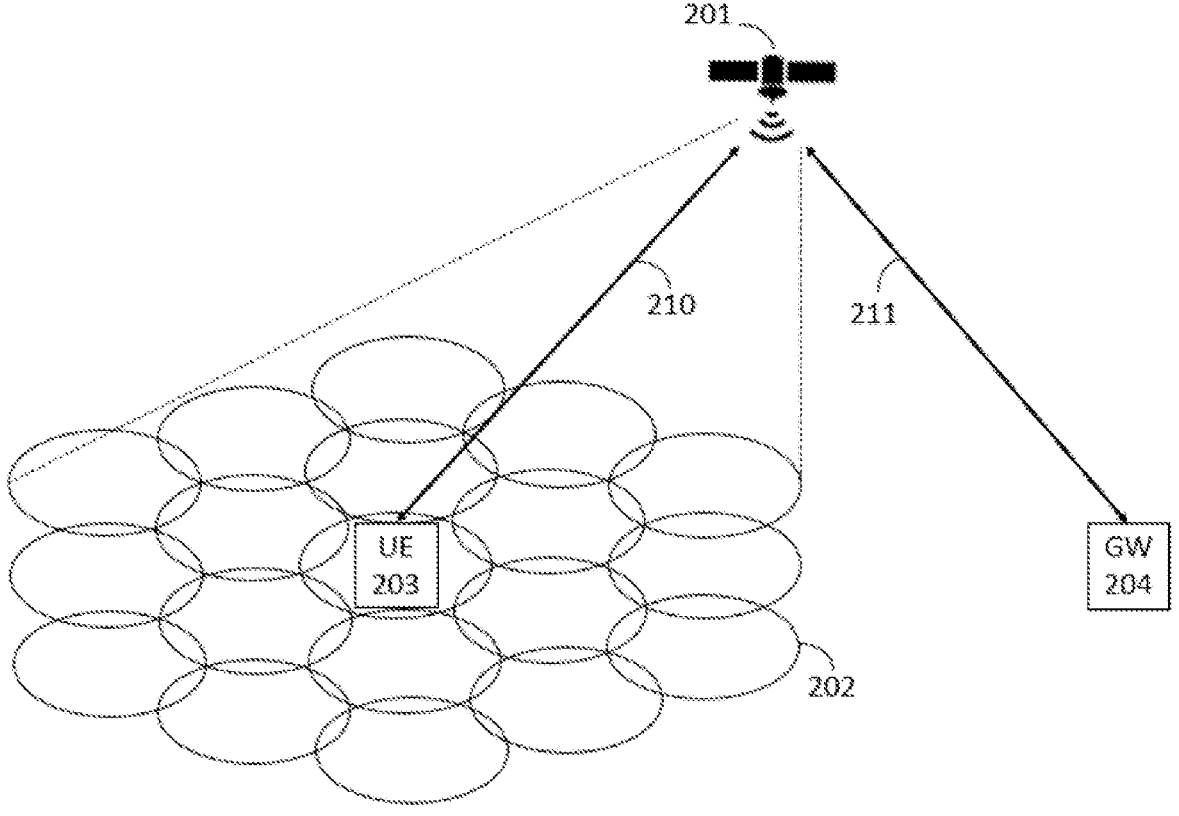
FIG. 2 illustrates an exemplary embodiment of a non-terrestrial network.

FIG. 2 illustrates an exemplary embodiment of a non-terrestrial network. A non-terrestrial network may refer to a network, or a segment of networks, using radio frequency (RF) resources in a satellite 201. The satellite 201 may be, for example, a LEO satellite, GEO satellite, HAPS, UAV, or any other spaceborne or airborne device used for communication.

The satellite 201 may provide services, for example NR services, on Earth via one or more satellite beams. The one or more satellite beams create one or more cells 202, for example NR cells, over a given service area bounded by the field of view of the satellite 201. The beam footprints, i.e. the cells 202, may be elliptical in shape.

There may be a service link 210, i.e. a first radio link, between the satellite 201 and one or more UEs 203 within the targeted service area for communication between the satellite 201 and the one or more UEs 203. Furthermore, there may be a feeder link 211, i.e. a second radio link, between the satellite 201 and one or more ground-based NTN gateways (GW) 204 for communication between the satellite 201 and the one or more gateways 204. The one or more gateways 204 may comprise a base station such as a gNB. The one or more gateways 204 may be connected to a 5G core network, for example.

The satellite 201 may implement a transparent payload with radio frequency filtering, frequency conversion and amplification, wherein the waveform signal repeated by the payload is unchanged. In the transparent architecture, the satellite 201 acts as a repeater between the one or more UEs 203 and the one or more gateways 204, i.e. the satellite 201 mirrors received signals and transmits an amplified version of the signal with frequency conversion from uplink to downlink frequencies. In other words, in the transparent architecture, the satellite 201 does not act as a base station. Alternatively, the satellite 201 may implement a regenerative payload, in which case the satellite may comprise partial or full base station functionality.

As a non-limiting example, the satellite 201 may be a LEO satellite at an altitude between 400 km to 2000 km. At such an altitude, the satellite may be moving at a speed of approximately 7.5 km/s relative to Earth. The cells 202 may be Earth-fixed cells (EFC) or Earth-moving cells (EMC). EFC means that the satellite 201 continuously adjusts the satellite beam pointing direction to fix the NR cell and NR beam to a specific point on Earth as the satellite is moving. EMC means that the satellite beam pointing direction is fixed, and thus the beam footprint (i.e. the NR cell) is continuously moving on Earth according to the movement of the satellite 201.

The one or more UEs 203 may have global navigation satellite system (GNSS) support, which means that the one or more UEs 203 have access to GNSS location information or more UEs 203 have access to GNSS location information and/or GNSS time information. The global positioning system (GPS) is an example of a GNSS. The GNSS support enables the one or more UEs 203 to obtain an understanding of the time and/or frequency relations between itself and the satellite 201 and/or an NTN gateway 204 for synchronization purposes. The GNSS information may also be used for mobility purposes and/or country identification. The satellite 201 may be a separate entity from the GNSS. The GNSS may also provide input to other network node(s) in the NTN system, so that the network node(s) are able to determine the position of the satellite at any given time.

While in RRC_IDLE, RRC_INACTIVE, or RRC_CONNECTED state, the one or more UEs 203 may also support UE-specific timing advance (TA) calculation and frequency pre-compensation to mitigate the Doppler shift experienced on the service link 210 based on the GNSS-acquired location and the ephemeris information of the serving satellite 201. The timing advance is an amount of time that the UE uses to adjust, or advance, the timing of the uplink frame in order to have alignment with the downlink frame in time domain. Thus, the UE may adjust its uplink transmissions by sending uplink symbols in advance according to the amount of time defined by the timing advance. The ephemeris information may be provided to the one or more UEs 203 in a system information block (SIB) for example by a base station comprised in the gateway 204. The ephemeris information may be provided in two different formats, which are called state vectors and orbital elements. Both formats provide information on the location and speed vector of the satellite 201 to the one or more UEs 203 at a given time instant. In other words, the ephemeris information indicates the position of the satellite 201 with respect to time.

The timing advance to be applied by the UE may be calculated for example as follows:

$$T_{TA} = (N_{TA} + N_{TA,UE-specific} + N_{TA,common} + N_{TA,offset}) \times T_c$$

$N_{TA}$ is defined as 0 for the physical random-access channel (PRACH), and it is updated based on the TA command field in msg2/msgB and the MAC control element (MAC CE) TA command.

$N_{TA,UE-specific}$ is a UE-specific TA estimated by the UE itself using GNSS information and ephemeris information of the serving satellite in order to pre-compensate for the service link delay.

$N_{TA,common}$ is a network-controlled common TA, and it may include any timing offset considered necessary by the network. This common TA is provided by the network (i.e. by the base station) to all UEs in the cell.

$N_{TA,offset}$ is a fixed offset used to calculate the timing advance.

One or more timers may be used for open-loop TA update to indicate the time interval during which the information used for updating the UE-specific TA and common TA, respectively, is valid. Due to the movement of the satellite and the UE, the information is no longer valid after a certain time period (i.e. the information becomes inaccurate), and thus the information needs to be updated. The information used for updating the UE-specific TA may comprise, for example, the ephemeris information of the serving satellite. The assistance information used for updating the common TA may comprise, for example the common TA received from the network, the common TA drift rate, and/or higher order derivatives of the common TA.

For updating the UE-specific TA, the UE may acquire satellite ephemeris information in the SIB and use an orbit propagator model to predict the UE-specific TA during a certain time period. However, the acquired ephemeris information will become invalid after this time period, depending on one or more parameters such as the orbit propagator model used by the UE, the accuracy of the ephemeris information at the time it is provided, the satellite and UE speed and direction of movement, the elevation angle of the service link (i.e. the angle between the UE and the satellite), the accuracy of the GNSS location information at the UE, and/or the maximum tolerable error on the estimation of the UE-specific TA. Similarly, for the common TA update, the assistance information acquired in the SIB will only be valid for a certain time period, which depends on one or more parameters such as the accuracy of the common TA, the maximum tolerable error on common TA estimation, the order of the common TA approximation to be carried out by the UE, the satellite and UE speed and direction of movement, and/or the elevation angle of the feeder link (i.e. the angle between the base station 204 and the satellite 201), combined with the distance offset between the UE and the orbital plane that the satellite is in.

Thus, such validity timer(s) define the maximum time during which the UE can apply the satellite ephemeris information and/or common TA without having acquired new information to be used for TA calculation. The maximum time during which the UE will be able to apply the satellite ephemeris information and/or assistance information for calculating the TA (UE-specific TA and/or common TA) without having acquired new information depends on how long the calculated TA can fulfil the UE requirements when being used for time synchronization.

At the reception of new ephemeris and assistance information, the UE may restart the related timer or timers, if a dedicated timer is used for each information part. For example, a dedicated ephemeris validity timer may be used for the satellite ephemeris information, and another dedicated common TA validity timer may be used for the common TA, or a single validity timer may be configured for both common TA and satellite ephemeris information. If the validity timer expires before new information is acquired, the UE assumes that it has lost uplink synchronization and needs to re-synchronize. A UE time alignment timer for re-acquisition of the satellite ephemeris information on SIB may be configured by the network.

In some cases, for example if the UE moves at a high speed and the relative speed between the satellite and the UE is increased due to the direction of movement and a low elevation angle, the validity time of the ephemeris information may be reduced. This is caused by the fact that the distance between the UE and the satellite is changing fast, compared to e.g. a static UE scenario. In addition, the high-speed movement of the UE may also increase the error in the GNSS-provided location information, which cannot be read more often than provided by GNSS, or is read as often as the SMTC configuration indicates. SMTC refers to synchronization signal block based measurement timing configuration. Thus, using the ephemeris information for an overly long time may in some cases lead to large errors in the calculation of the UE-specific TA.

On the other hand, it would be inefficient if the base station configures the UE too conservatively to use a very short validity timer to safely cover scenarios such as the one mentioned above. This would result in a situation, where the UE obtains the ephemeris information by reading the cor-responding SIB more often than needed, which would increase overhead unnecessarily.

Some exemplary embodiments enable a UE to autonomously adjust the validity timer(s) in order to provide a more flexible dimensioning of the validity timer(s) in both directions (i.e. shortening or prolonging the timer as needed). This provides the benefit of ensuring that the ephemeris information and/or other information is up-to-date and can be safely used for TA calculation, and the UE also avoids updating the ephemeris information more frequently than needed. In other words, the UE is able to adjust the validity timer(s) so that it is neither too long nor too short. Some exemplary embodiments may be applied, for example, to NR, narrowband internet of things (NB-IoT), and/or enhanced machine type communication (eMTC) over NTN. However, it should be noted that some exemplary embodiments are not limited to NR, NB-IoT and eMTC.

Figures 3, 4:
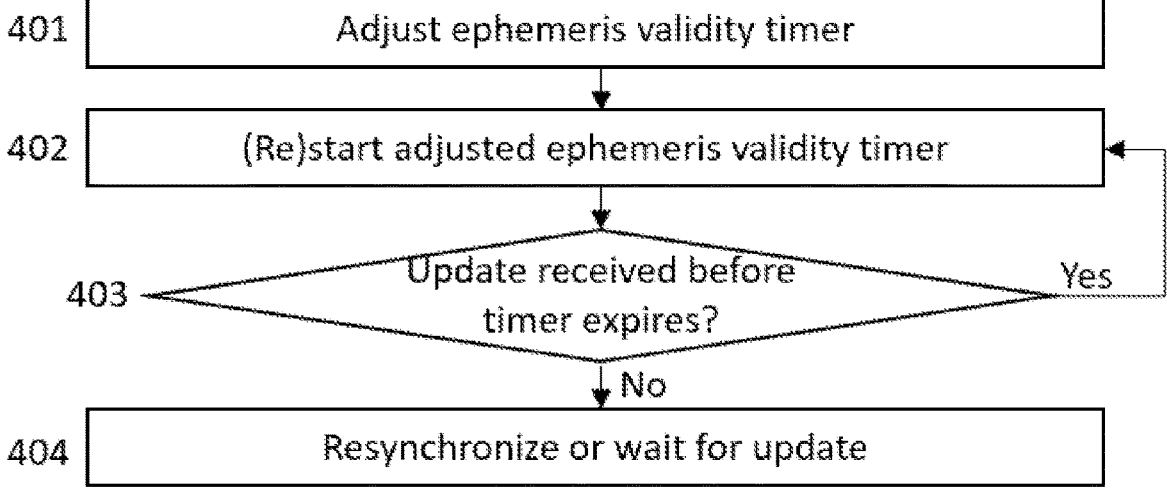
FIGS. 3-8 illustrate flow charts according to some exemplary embodiments.

FIG. 3 illustrates a flow chart according to an exemplary embodiment. The functions illustrated in FIG. 3 may be performed by an apparatus such as, or comprised in, a UE. Referring to FIG. 3, one or more timers associated with uplink synchronization are adjusted 301 based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a GNSS, an accuracy requirement for TA estimation performed by the apparatus, and/or a common TA broadcast rate.

The relative speed between the apparatus and the satellite may be derived as a difference between the speed of the apparatus and the speed of the satellite.

The orbit propagator model refers to the model used by the apparatus for tracking and/or predicting the movement of the satellite. For example, the apparatus may use the orbit propagator model to predict the location of the satellite at future time instant(s). Different orbit propagator models can result in different interpolation and/or prediction errors.

The first elevation angle refers to the elevation angle associated with the service link, i.e. it is the angle between the UE and the satellite. The first elevation angle depends on the UE location and altitude, as well as on the location of the satellite with respect to the UE.

The second elevation angle refers to the elevation angle associated with the feeder link, i.e. it is the angle between the base station and the satellite. The second elevation angle depends on the location and altitude of the base station, as well as on the location of the satellite with respect to the base station.

The accuracy of the ephemeris information may be impacted by the accuracy with which the information is delivered to the UE. The accuracy with which the information is delivered may depend on the bit allocations for a given information element. In other words, the granularity of the position may depend on the number of bits used to provide the ephemeris information. For example, the x,y,z position of the satellite may be provided with steps of 10 m granularity, and the same may apply for the velocity vector, although the information would be provided in m/s for the velocity.

Alternatively or additionally, the accuracy of the ephemeris information may be impacted by the aging of the ephemeris information since the last received update, which may depend on the rate at with which the ephemeris information is provided by the base station and when the UE last read the ephemeris information (for example the UE may have skipped a reading). The aging refers to the time elapsed from the last ephemeris information update received by the UE. After a certain amount of time has elapsed since the last update, the ephemeris information may not be accurate anymore (for example, the direction vector of the last received ephemeris information may be pointing to a straight line, while the satellite is actually moving on an arc at that moment).

Further, the accuracy of the ephemeris information may be impacted by inaccuracies in the satellite's own assessment of its position, direction, and/or velocity.

The accuracy requirement for TA estimation performed by the apparatus refers to the required accuracy level for UE-specific TA estimation. For example, if the common TA is available at the UE with a very high accuracy, e.g. the common TA information has been recently acquired by the UE by reading the corresponding SIB, then the requirement for the UE-specific TA calculation can potentially be relaxed, so that the UE still fulfills the overall requirement for TA accuracy.

The one or more adjusted timers may comprise, for example, an ephemeris validity timer, a dedicated GNSS validity timer, a common TA validity timer, and/or any other timer associated with uplink synchronization and/or TA.

The ephemeris validity timer, which may also be referred to as a first timer herein, indicates a first time interval during which the ephemeris information associated with the satellite is valid. In other words, the ephemeris validity timer defines the maximum time during which the UE can apply the ephemeris information without having acquired new ephemeris information to be used for TA calculation.

FIG. 4 illustrates a flow chart according to an exemplary embodiment, wherein an ephemeris validity timer is adjusted. The functions illustrated in FIG. 4 may be performed by an apparatus such as, or comprised in, a UE. Referring to FIG. 4, an ephemeris validity timer is adjusted 401 based at least partly on at least one of: a velocity of the apparatus, a velocity of a satellite, a movement direction of the apparatus, a movement direction of the satellite, a relative speed between the apparatus and the satellite, an accuracy of ephemeris information associated with the satellite, an orbit propagator model associated with the satellite, a first elevation angle between the apparatus and the satellite, a second elevation angle between a base station and the satellite, an accuracy of location information provided by a GNSS, and/or an accuracy requirement for timing advance estimation performed by the apparatus. The adjusted ephemeris validity timer is started 402. If new ephemeris information is received before the adjusted ephemeris validity timer expires (403: yes), then the apparatus reads the new ephemeris information from SIB and the adjusted ephemeris validity timer is restarted 402 (i.e. the process returns to block 402 and continues from there). If the adjusted ephemeris validity timer expires before new ephemeris information is received (403: no), then the UE assumes that it has lost uplink synchronization and it may resynchronize 404 with the base station, or wait for new valid ephemeris information that would allow the UE to reset and restart the ephemeris validity timer. In other words, the ephemeris information may be provided to the UE on a regular basis by the base station, and the UE should read this information prior to the ephemeris validity timer expiring in order to maintain synchronization. While the ephemeris validity timer is running, the UE may assume that it is synchronized to the base station.

The ephemeris validity timer may also relate to the rate at which the UE reads GNSS location information. For example, before the ephemeris validity timer expires and the UE updates the ephemeris information, the UE may also update GNSS location information in order to be used along with the updated ephemeris information for the calculation of UE-specific TA. Thus, it may be beneficial if the time interval between consecutive GNSS readings is not larger than the ephemeris validity timer. Thus, reading ephemeris information less frequently may allow for less frequent reading of the GNSS as well, which may reduce UE power consumption.

Alternatively, a dedicated GNSS validity timer may be used. The dedicated GNSS validity timer, which may also be referred to as a second timer herein, indicates a second time interval during which the location information provided by the GNSS is valid. In other words, the dedicated GNSS validity timer instructs the UE on how long it can use the GNSS location information before it becomes too inaccurate. Thus, the dedicated GNSS validity timer may define the minimum rate for reading GNSS information and updating the location information and time/frequency synchronization parameters. The second time interval of the GNSS validity timer may be a fraction or a multiple of the first time interval of the ephemeris validity timer.

Figure 5:
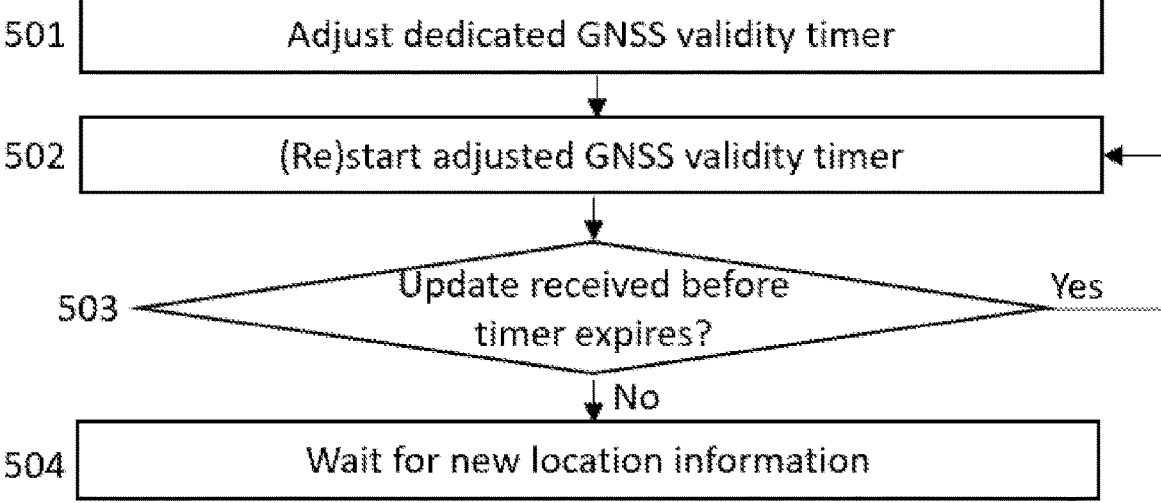

FIG. 5 illustrates a flow chart according to an exemplary embodiment, wherein a dedicated GNSS validity timer is adjusted. The functions illustrated in FIG. 5 may be performed by an apparatus such as, or comprised in, a UE. Referring to FIG. 5, a dedicated GNSS validity timer is adjusted 501 based at least partly on one or more parameters such as the relative speed between the UE and the satellite, the elevation angle (i.e. the first elevation angle) between the UE and the satellite, and/or an accuracy of location information provided by a GNSS. The adjusted GNSS validity timer is started 502. If new location information is received via a GNSS signal before the adjusted GNSS timer expires (503: yes), then the location information is updated and the adjusted GNSS timer is restarted 502 (i.e. the process returns to block 502 and continues from there). Time and/or frequency synchronization parameters may also be updated. If the adjusted GNSS timer expires before new location information is received (503: no), then the UE assumes that it has lost uplink synchronization, and the UE waits 504 for new location information that would allow the UE to reset and restart the GNSS validity timer. In other words, after the GNSS timer expires, the UE does not perform any uplink actions until new location information is received.

Figure 6:
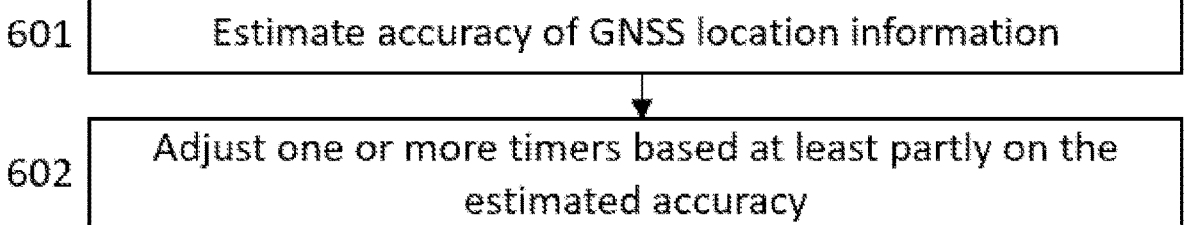

The accuracy (or accuracy level) of the location information provided by the GNSS may be estimated by the UE itself. FIG. 6 illustrates a flow chart according to an exemplary embodiment, wherein the accuracy of the GNSS location information is estimated. The functions illustrated in FIG. 6 may be performed by an apparatus such as, or comprised in, a UE. Referring to FIG. 6, an accuracy of location information provided by a GNSS is estimated 601 based at least partly on at least one of: a variance of a GNSS reference such as a location reference or a time reference, a number of satellites used by the GNSS, a rate of reading the GNSS signal by the UE, and/or UE knowledge about the quality or accuracy of its own hardware component(s) (e.g. a local oscillator frequency accuracy defined as parts per million) involved in reading the GNSS signal and obtaining the reference. The variance of the GNSS reference may be measured over an observation time window. One or more timers, for example an ephemeris validity timer and/or a dedicated GNSS validity timer, is adjusted 602 based at least partly on the estimated accuracy of the location information.

The common TA validity timer, which may also be referred to as a third timer herein, indicates a third time interval during which a common TA is valid. In other words, the common TA validity timer defines the maximum time during which the UE can apply the common TA without having acquired new common TA parameters to be used for TA calculation.

Figure 7:
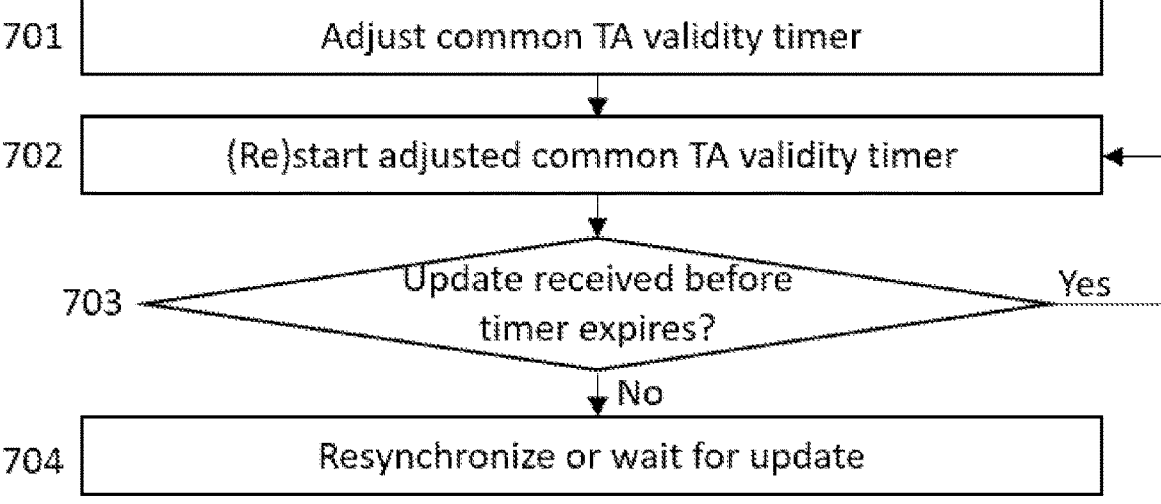

FIG. 7 illustrates a flow chart according to an exemplary embodiment, wherein a common TA validity timer is adjusted. The functions illustrated in FIG. 7 may be performed by an apparatus such as, or comprised in, a UE (i.e. the UE may autonomously adjust the common TA validity timer). Referring to FIG. 7, a common TA validity timer is adjusted 701 based on one or more feeder link parameters such as: an elevation angle (i.e. the second elevation angle) between a base station and a satellite, a rate at which assistance information such as common TA, common TA drift rate and/or higher order derivatives of common TA is provided to the UE from the base station, and/or the content of the assistance information. If new assistance information is received before the timer expires (703: yes), then the adjusted common TA validity timer is restarted 702 (i.e. the process returns to block 702 and continues from there). If the adjusted common TA validity timer expires before new assistance information is received (703: no), then the UE assumes that it has lost uplink synchronization and it may resynchronize 704 with the base station, or the UE may wait for new assistance information that would allow the UE to reset and restart the common TA validity timer.

The rules for adjusting the validity timer(s) may be (pre-)configured to the UE by the base station in different ways. For example, the base station may provide the UE with one or more threshold values for one or more of the parameters (e.g. the relative speed between the UE and the satellite, the first elevation angle, the second elevation angle, and/or the accuracy of the location information, etc.), and the UE may then use the one or more threshold values to indicate when to adjust the validity timer(s). The base station may also provide a set of scaling factor values to be applied to the validity timer(s). Depending on the value of the one or more parameters in relation to the one or more threshold values, the UE may apply the corresponding scaling factor to adjust the default validity timer (if defined), or the most recent validity timer that has been provided by the base station.

As a non-limiting example, the UE may be provided a first threshold value related to the relative speed between the UE and the satellite. If the observed relative speed between the UE and the satellite exceeds the first threshold value, then the UE may adjust the validity timer by decreasing the value of the validity timer (e.g. by a constant value or by scaling the value with a scaling factor). This will cause the UE to read the ephemeris information more frequently.

Figure 8:
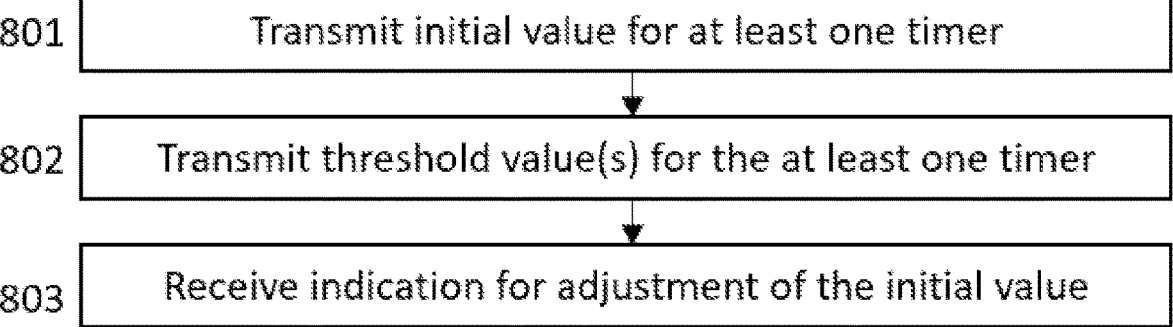

FIG. 8 illustrates a flow chart according to an exemplary embodiment, wherein the base station configures the UE with one or more threshold values. The functions illustrated in FIG. 8 may be performed by an apparatus such as, or comprised in, a base station (for example a gNB).

Referring to FIG. 8, an initial value per timer for at least one timer associated with uplink synchronization is transmitted 801 to a UE. The at least one timer may comprise, for example, an ephemeris validity timer, a dedicated GNSS validity timer, a common TA validity timer, and/or any other timer used for uplink synchronization. For example, the UE may be provided with at least one of: a first initial value for the ephemeris validity timer, a second initial value for the dedicated GNSS validity timer, and/or a third initial value for the common TA validity timer.

One or more threshold values for adjusting the initial value of the at least one timer are transmitted 802 to the UE, wherein the one or more threshold values are associated with at least one of: a velocity of the UE, a velocity of a satellite, a movement direction of the UE, a movement direction of the satellite, a relative speed between the UE and the satellite, an accuracy of ephemeris information associated with the satellite, a first elevation angle between the UE and the satellite, a second elevation angle between the apparatus and the satellite, an accuracy of location information provided by a GNSS, an accuracy requirement for TA estimation performed by the UE, and/or a common TA broadcast rate of the apparatus.

An indication indicating an adjustment of the initial value of the at least one timer by the UE is received 803 from the UE. For example, the indication 803 may indicate the adjusted value of the at least one timer, or the difference between the adjusted value and the initial value.

The communication between the base station and the UE may occur via the satellite as illustrated in FIG. 2, in which the gateway 204 comprises the base station.

Figure 9:
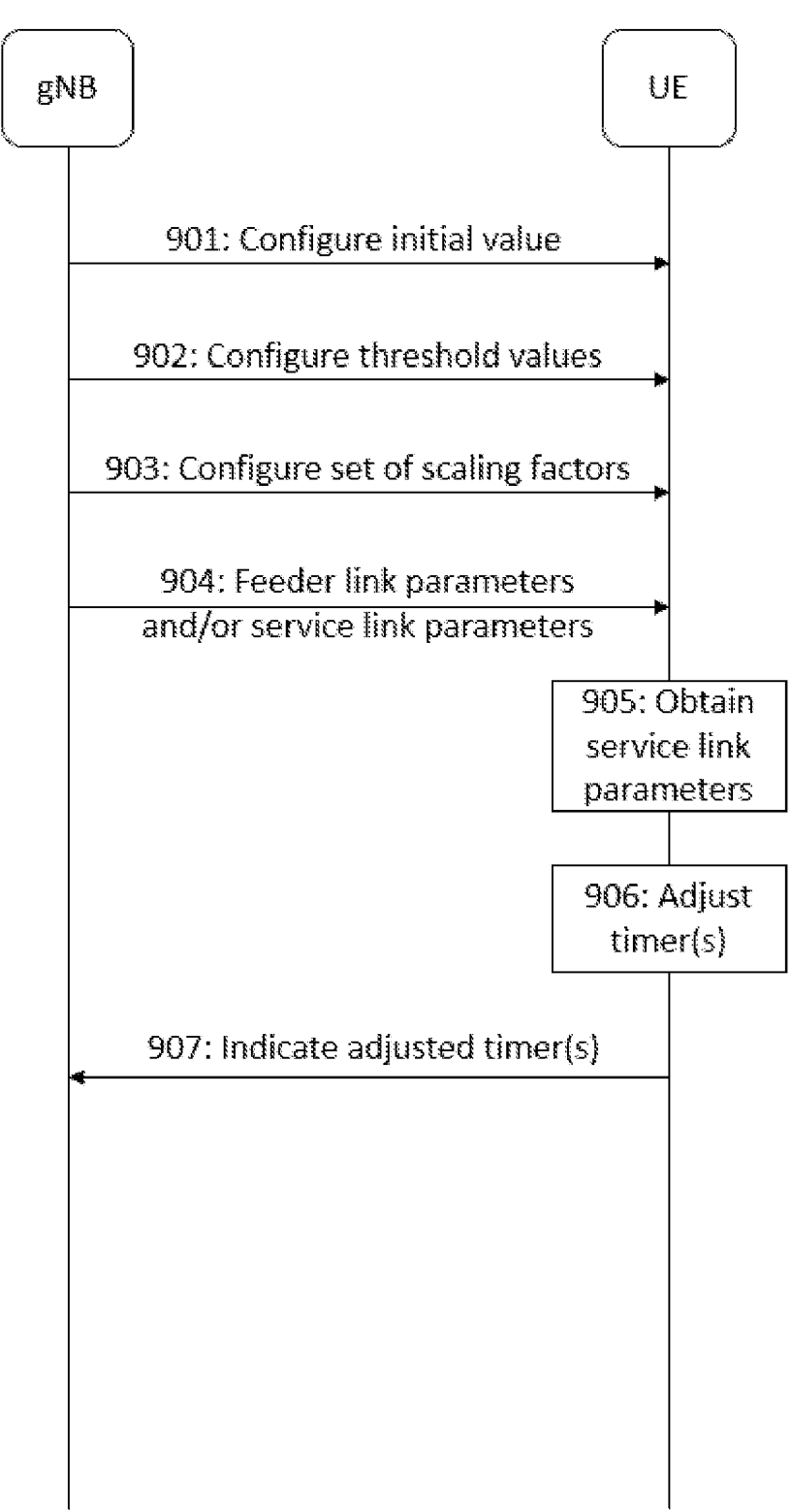
FIGS. 9-10 illustrate signaling diagrams according to some exemplary embodiments.

FIG. 9 illustrates a signaling diagram according to an exemplary embodiment. Referring to FIG. 9, a base station such as a gNB transmits 901, to a UE, an indication for configuring an initial value per timer for at least one timer. The at least one timer may comprise, for example, an ephemeris validity timer, a dedicated GNSS validity timer, a common TA validity timer, and/or any other timer used for uplink synchronization. The initial value defines a time interval per timer to be applied by the at least one timer. The initial value may also be referred to as a default value. The base station transmits 902, to the UE, an indication for configuring one or more threshold values for one or more feeder link parameters and/or one or more service link parameters. In other words, the base station may configure one or more parameters to be used for adjusting the at least one timer, as well as a threshold value for each parameter. The base station transmits 903, to the UE, an indication for configuring a set of scaling factors to be used for adjusting the at least one timer. The initial value, the one or more threshold values, and the set of scaling factors may be transmitted together in a single message, or they may be transmitted in separate messages.

The base station transmits 904, to the UE, the one or more feeder link parameters and/or at least a first subset of service link parameters. The one or more feeder link parameters may comprise, for example, an elevation angle (i.e. the second elevation angle) between the base station and the satellite, a rate at which assistance information such as common TA, common TA drift rate and/or higher order derivatives of common TA is provided to the UE from the base station, and/or the content of the assistance information. The at least first subset of service link parameters provided to the UE by the base station may comprise, for example, the position, movement direction and/or velocity of the satellite (i.e. ephemeris information). The UE may obtain the at least first subset of service link parameters by reading the ephemeris information associated with the satellite.

In addition to the at least first subset of service link parameters provided by the base station, the UE may obtain 905, or determine, the value of at least a second subset of service link parameters, such as: a velocity of the UE, a movement direction of the UE, a relative speed between the UE and the satellite, an accuracy of the ephemeris information associated with the satellite, a first elevation angle between the UE and the satellite, an accuracy of location information provided by a GNSS, and/or an accuracy requirement for TA estimation performed by the UE. The UE may obtain, or determine, the at least second subset of service link parameters based at least partly on the ephemeris information, the location information (e.g. position of the UE) provided by the GNSS, and/or hard-coded information (e.g. orbit propagator model of the satellite) for example on a subscriber identity module (SIM) or a pre-stored memory of the UE or from infrequent broadcast information.

The UE adjusts 906 the at least one timer based at least partly on the one or more threshold values associated with the one or more feeder link parameters and/or the one or more service link parameters. For example, the UE may select a scaling factor from the set of scaling factors based on the value of the one or more feeder link parameters and/or the one or more service link parameters in relation to the corresponding threshold value, and apply the selected scaling factor to the at least one timer by multiplying the initial value of the at least one timer by the selected scaling factor. The UE applies the adjusted at least one timer for uplink synchronization. If there are multiple validity timers, the UE may apply a single scaling factor to all of the timers, or the UE may apply one or more timer-specific scaling factors per timer to one or more of the timers. In other words, the UE may apply the same scaling factor to multiple timers, or the UE may apply different scaling factors to different timers (e.g. if the timers are based on different input parameters). For example, the UE may apply a first scaling factor to the ephemeris validity timer, a second scaling factor to the dedicated GNSS validity timer, and/or a third scaling factor to the common TA validity timer.

The UE indicates 907, or reports, the adjusted at least one timer to the base station for example in a MAC CE or a RRC message. For example, the UE may indicate the adjusted value of the at least one timer, or the difference between the adjusted value and the initial value, to the base station.

The communication between the base station and the UE may occur via the satellite as illustrated in FIG. 2, in which the gateway 204 comprises the base station.

It should be noted that, in some exemplary embodiments, fully autonomous adjustment by the UE of the ephemeris validity timer(s) can be also realized without gNB instruction. For example, the UE may be pre-configured, or hard-coded, with the rules (e.g. the parameters, threshold values and/or scaling factors) for adjusting the validity timer(s). In this case, the UE may independently shorten or prolong the validity timer(s) based on the one or more feeder link parameters and/or service link parameters, for example. The UE may then report the adjusted value of the validity timer(s) to the base station, so that the base station is aware of the UE's actions and whether the UE has adjusted the initial value of the validity timer(s).

For example, in the UE autonomous operation, the UE may receive the initial value of the validity timer(s) from the base station, but the UE may then decide to apply a different value than the initial value configured by the base station, for example depending on the hardware performance of the UE. Alternatively, the UE may fully ignore any initial value(s) provided by the base station, and the UE may then just set its own value for the validity timer(s). Both approaches allow the UE to adjust its validity timer(s) based on the service link parameters and/or feeder link parameters.

In another exemplary embodiment, the validity timer may depend on the ephemeris broadcast rate, i.e. the rate at which the base station broadcasts the ephemeris information. In this case, the base station may provide additional flexibility for the validity timer adjustment in the form of a ratio, which is related to the ephemeris broadcast rate. The value of the ratio may be adjusted by the base station based on one or more feeder link parameters, for example. The value of the ratio may also be adjusted by the UE.

For example, the base station may have a broadcast rate for sending the ephemeris information e.g. every 1 second, and the ephemeris validity timer may be set to e.g. 5 seconds. Thus, the ratio would be 5:1 in this example, i.e. 5 ephemeris messages provided per validity timer. If the base station changes this ratio to send the ephemeris information e.g. every 0.5 seconds, then the UE may adjust its validity timer accordingly such that the ratio of 5:1 is maintained (i.e. the validity timer would be adjusted from 5 seconds to 2.5 seconds after changing the ephemeris broadcast rate from 1 second to 0.5 seconds). The ratio may also be applied to any offset or adjustment that may have been previously applied to the validity timer.

In terms of signaling, this can be efficient for Earth-fixed cells, wherein the base station may adjust the ephemeris broadcast rate for all UEs in the cell when the satellite is moving. In addition, a further UE-specific adjustment through the ratio may be possible for each UE. With Earth-fixed cells, the distance to the satellite may change during a fly-over of the satellite. When the satellite is at nadir (i.e. directly above the UE), the rate of change of some parameters may not require frequent update, while some may require more frequent updates when the elevation angle is lower. Also, the parameters for the feeder link may have a dependency to the satellite's position relative to the base station (e.g. the common TA, which does not change rapidly when the satellite is directly above the base station).

Figure 10:
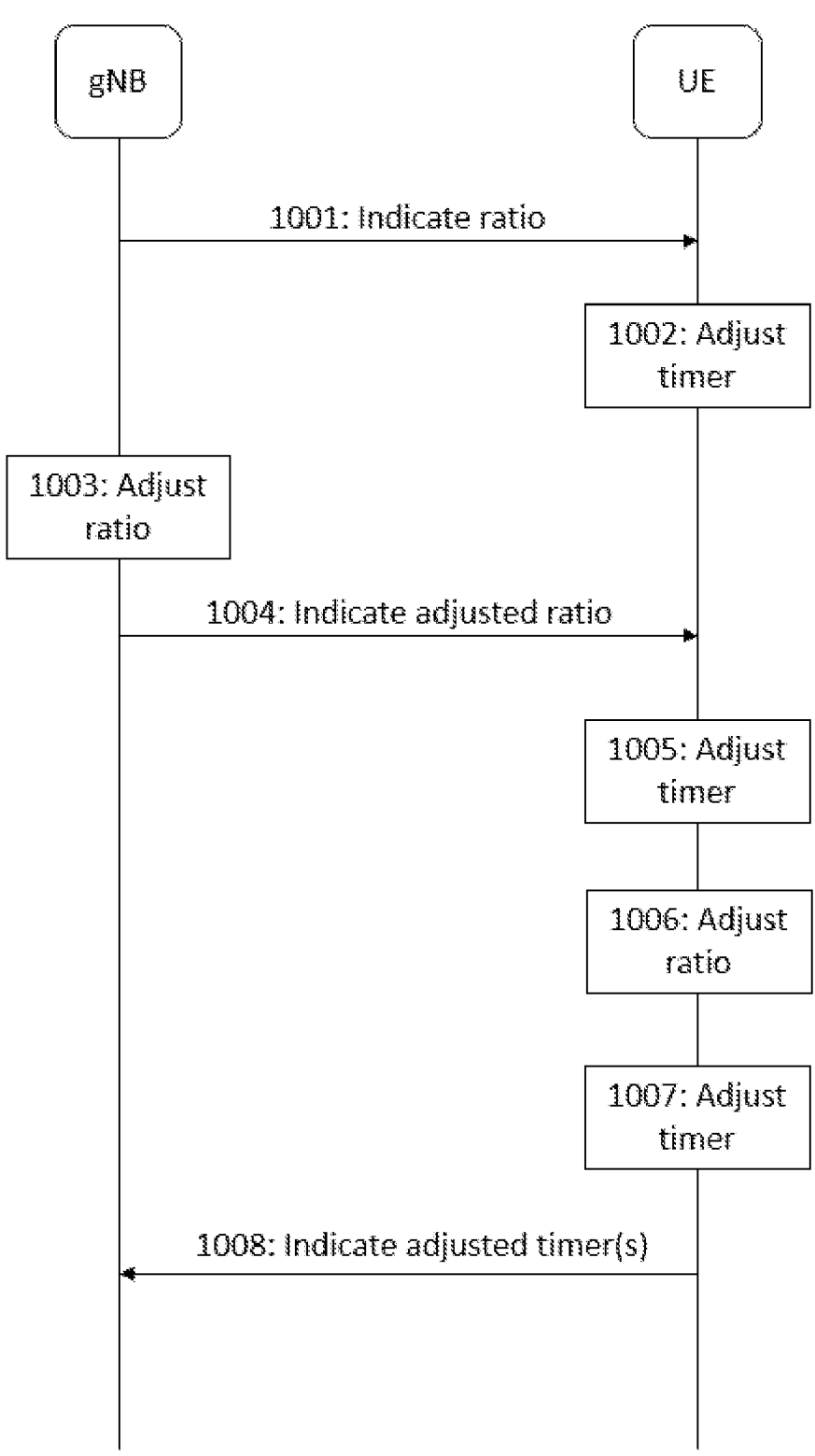

FIG. 10 illustrates a signaling diagram according to another exemplary embodiment, wherein a UE is configured with at least one timer, such as an ephemeris validity timer, that is based at least partly on a ratio associated with an ephemeris broadcast rate.

Referring to FIG. 10, a base station such as a gNB transmits 1001, to a UE, an indication indicating a ratio associated with an ephemeris broadcast rate to be used for the at least one timer. The UE adjusts 1002, or establishes, the at least one timer by applying the indicated ratio to the ephemeris validity timer.

The base station adjusts 1003 the ratio for example based on one or more feeder link parameters, and/or an adjusted ephemeris broadcast rate. The base station indicates 1004 the adjusted ratio to the UE. The UE adjusts 1005 the ephemeris validity timer by applying the adjusted ratio to the ephemeris validity timer.

The UE may further adjust 1006 the ratio for example based on one or more service link parameters. The UE may then further adjust 1007 the ephemeris validity timer by applying the UE-adjusted ratio to the ephemeris validity timer. The UE may indicate 1008, or report, the adjusted timer and/or the UE-adjusted ratio to the base station.

The functions and/or blocks described above by means of FIGS. 3-10 are in no absolute chronological order, and some of them may be performed simultaneously or in an order differing from the described one. Other functions and/or blocks may also be executed between them or within them.

A technical advantage provided by some exemplary embodiments is that they may improve the accuracy of TA applied by the UE by ensuring that the ephemeris information and/or other information is up-to-date to be used for TA calculation. In addition, some exemplary embodiments may reduce computational overhead and power consumption, since they enable the UE to avoid updating the information more frequently than needed.

Figure 11:
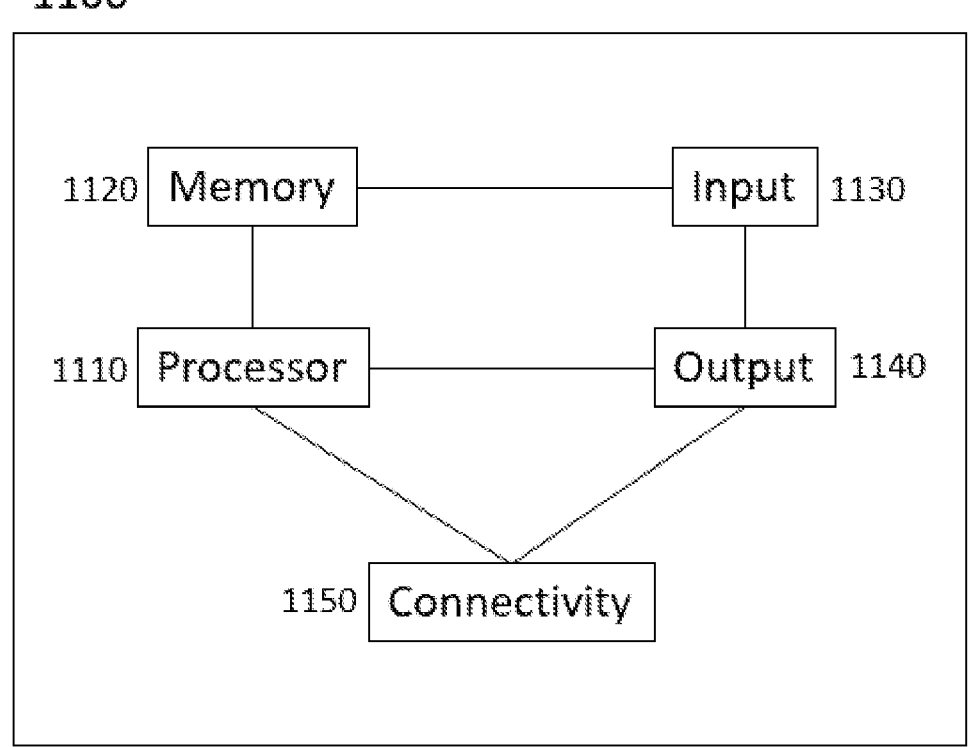
FIGS. 11-12 illustrate apparatuses according to some exemplary embodiments.

FIG. 11 illustrates an apparatus 1100, which may be an apparatus such as, or comprised in, a terminal device, according to an exemplary embodiment. A terminal device may also be referred to as a UE or user equipment herein. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application-specific integrated circuits (ASICs).

The processor 1110 is coupled to a memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1120 stores computer readable instructions that are executed by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1100 may further comprise, or be connected to, an input unit 1130. The input unit 1130 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1130 may comprise an interface to which external devices may connect to.

The apparatus 1100 may also comprise an output unit 1140. The output unit may comprise or be connected to one or more displays capable of rendering visual content, such as a light emitting diode (LED) display, a liquid crystal display (LCD) and/or a liquid crystal on silicon (LCoS) display. The output unit 1140 may further comprise one or more audio outputs. The one or more audio outputs may be for example loudspeakers.

The apparatus 1100 further comprises a connectivity unit 1150. The connectivity unit 1150 enables wireless connectivity to one or more external devices. The connectivity unit 1150 comprises at least one transmitter and at least one receiver that may be integrated to the apparatus 1100 or that the apparatus 1100 may be connected to. The at least one transmitter comprises at least one transmission antenna, and the at least one receiver comprises at least one receiving antenna. The connectivity unit 1150 may comprise an integrated circuit or a set of integrated circuits that provide the wireless communication capability for the apparatus 1100. Alternatively, the wireless connectivity may be a hardwired application-specific integrated circuit (ASIC). The connectivity unit 1150 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1100 may further comprise various components not illustrated in FIG. 11. The various components may be hardware components and/or software components.

Figure 12:
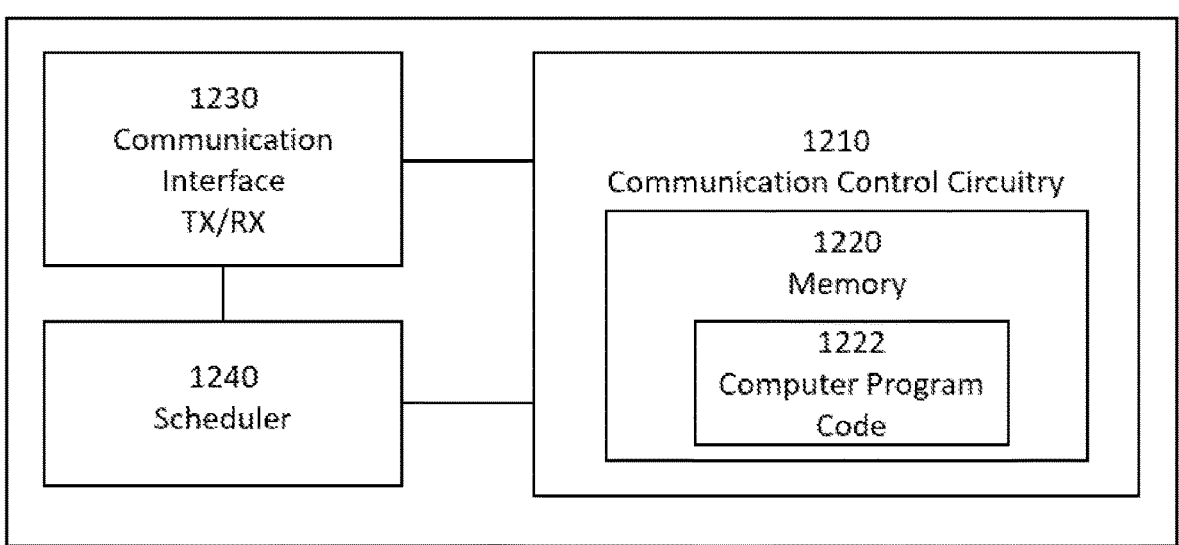

The apparatus 1200 of FIG. 12 illustrates an exemplary embodiment of an apparatus such as, or comprised in, a satellite or a base station such as a gNB. The apparatus may comprise, for example, a circuitry or a chipset applicable for realizing some of the described exemplary embodiments. The apparatus 1200 may be an electronic device comprising one or more electronic circuitries. The apparatus 1200 may comprise a communication control circuitry 1210 such as at least one processor, and at least one memory 1220 including a computer program code (software) 1222 wherein the at least one memory and the computer program code (software) 1222 are configured, with the at least one processor, to cause the apparatus 1200 to carry out some of the exemplary embodiments described above.

The processor is coupled to the memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1220 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

The memory 1220 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1200 may further comprise a communication interface 1230 comprising hardware and/or software for realizing communication connectivity according to one or more communication protocols. The communication interface 1230 comprises at least one transmitter (TX) and at least one receiver (RX) that may be integrated to the apparatus 1200 or that the apparatus 1200 may be connected to. The communication interface 1230 provides the apparatus with radio communication capabilities to communicate in the cellular communication system. The communication interface may, for example, provide a radio interface to terminal devices. The apparatus 1200 may further comprise another interface towards a core network such as the network coordinator apparatus and/or to the access nodes of the cellular communication system. The apparatus 1200 may further comprise a scheduler 1240 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

receive an initial value per timer for one or more timers associated with uplink synchronization;

receive a set of scaling factors;

receive a ratio associated with an ephemeris broadcast rate;

estimate an accuracy of a location information based at least partly on a variance of a location reference or a time reference, a number of satellites used, a rate of reading a global navigation satellite system signal, and an accuracy of one or more hardware components used for reading the global navigation satellite system signal;

receive one or more threshold values for a velocity of the apparatus, a velocity of a satellite, a movement direction of the apparatus, a movement direction of the satellite, a relative speed between the apparatus and the satellite, an accuracy of ephemeris information associated with the satellite, an orbit propagator model, a first elevation angle between the apparatus and the satellite, a second elevation angle between a base station and the satellite, an accuracy of location information provided by a global navigation satellite system, an accuracy requirement for timing advance estimation performed by the apparatus, and a common timing advance broadcast rate;

adjust the one or more timers based at least partly on the velocity of the apparatus, the velocity of the satellite, the movement direction of the apparatus, the movement direction of the satellite, the relative speed between the apparatus and the satellite, the accuracy of the ephemeris information associated with the satellite, the orbit propagator model associated with the satellite, the first elevation angle between the apparatus and the satellite, the second elevation angle between the base station and the satellite, the accuracy of the location information provided by the global navigation satellite system, the accuracy requirement for timing advance estimation performed by the apparatus, and the common timing advance broadcast rate, wherein the adjusted one or more timers comprise at least a first timer indicating a first time interval during which the ephemeris information associated with the satellite is valid, a second timer indicating a second time interval during which the location information provided by the global navigation satellite system is valid, and a third timer indicating a third time interval during which a common timing advance is valid, wherein the first timer is based at least partly on the ratio associated with the ephemeris broadcast rate, wherein the first timer is adjusted by adjusting the ratio, wherein the one or more timers are adjusted based at least partly on the one or more threshold values, wherein at least one of the one or more timers is adjusted by applying a scaling factor of the set of scaling factors to the at least one of the one or more timers, wherein the at least one of the one or more timers is adjusted by multiplying the initial value by the scaling factor of the set of scaling factors, wherein the scaling factor of the set of scaling factors applied to the at least one of the one or more timers is selected from the set of scaling factors based on the velocity of the apparatus, the velocity of the satellite, the movement direction of the apparatus, the movement direction of the satellite, the relative speed between the apparatus and the satellite, the accuracy of the ephemeris information associated with the satellite, the orbit propagator model, the first elevation angle between the apparatus and the satellite, the second elevation angle between the base station and the satellite, the accuracy of the location information, the accuracy requirement for timing advance estimation performed by the apparatus, and the common timing advance broadcast rate, and wherein the apparatus is comprised in a terminal device; and indicate, to the base station, the adjusted one or more timers in a Medium Access Control (MAC) Control Element (CE) or Radio Resource Control (RRC) message.

* * * * *